(12) United States Patent
Cho et al.

(10) Patent No.: US 9,363,842 B2
(45) Date of Patent: Jun. 7, 2016

(54) METHOD OF TRANSMITTING AND RECEIVING DATA IN A WIRELESS COMMUNICATION SYSTEM AND APPARATUS THEREFOR

(75) Inventors: Heejeong Cho, Anyang-si (KR); Eunjong Lee, Anyang-si (KR); Youngsoo Yuk, Anyang-si (KR); Kiseon Ryu, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 108 days.

(21) Appl. No.: 14/002,067

(22) PCT Filed: Feb. 27, 2012

(86) PCT No.: PCT/KR2012/001460
§ 371 (c)(1),
(2), (4) Date: Aug. 28, 2013

(87) PCT Pub. No.: WO2012/118311
PCT Pub. Date: Sep. 7, 2012

(65) Prior Publication Data
US 2013/0336227 A1 Dec. 19, 2013

Related U.S. Application Data

(60) Provisional application No. 61/448,186, filed on Mar. 1, 2011.

(51) Int. Cl.
*H04W 4/00* (2009.01)
*G01R 31/08* (2006.01)
(Continued)

(52) U.S. Cl.
CPC .............. *H04W 76/025* (2013.01); *H04B 7/026* (2013.01); *H04W 48/16* (2013.01); *H04W 48/10* (2013.01); *H04W 76/023* (2013.01); *H04W 88/04* (2013.01)

(58) Field of Classification Search
CPC .................................................. H04W 76/043
USPC ......................................................... 370/328
See application file for complete search history.

(56) References Cited

U.S. PATENT DOCUMENTS

2007/0142058 A1* 6/2007 Matsumura ......... H04W 76/023
455/452.2
2007/0213038 A1* 9/2007 Masseroni ........ H04L 29/06027
455/414.3
(Continued)

FOREIGN PATENT DOCUMENTS

EP 2282586 2/2011

OTHER PUBLICATIONS

Doppler, et al., "Device-to-Device Communication as an Underlay to LTE-Advanced Networks," IEEE Communications Magazine, vol. 47, No. 12, Dec. 2009, pp. 42-49.
(Continued)

*Primary Examiner* — Gerald Smarth
(74) *Attorney, Agent, or Firm* — Lee, Hong, Degerman, Kang & Walmey; Jonathan Kang; Michael Monaco

(57) ABSTRACT

The present invention relates to a method and apparatus for transmitting and receiving data in a wireless communication. In a communication performed by a user equipment supporting a multi-RAT (multi-radio access technology), the present invention includes receiving a 1st information for identifying a 1st cooperative user equipment candidate from the 1st cooperative user equipment candidate corresponding to at least one of a plurality of cooperative user equipment candidates, transmitting the 1st information to a base station, receiving an information on at least one 2nd cooperative user equipment candidate determined among the at least one 1st cooperative user equipment candidate using the 1st information from the base station, and performing a communication of a 1st data with the base station in cooperation with the at least one 2nd cooperative user equipment candidate. Moreover, the user equipment and a plurality of the cooperative user equipment candidates support a direct communication without using an access point.

14 Claims, 15 Drawing Sheets

(51) Int. Cl.
  *H04W 76/02* (2009.01)
  *H04W 48/16* (2009.01)
  *H04B 7/02* (2006.01)
  *H04W 48/10* (2009.01)
  *H04W 88/04* (2009.01)

(56) References Cited

U.S. PATENT DOCUMENTS

| | | | |
|---|---|---|---|
| 2009/0017789 A1* | 1/2009 | Thomas | H04L 12/14 455/406 |
| 2009/0116430 A1* | 5/2009 | Bonta et al. | 370/329 |
| 2009/0325622 A1* | 12/2009 | Matsumura | H04B 7/2606 455/522 |
| 2010/0014463 A1* | 1/2010 | Nagai | H04B 7/0695 370/328 |
| 2010/0061326 A1* | 3/2010 | Lee et al. | 370/329 |
| 2010/0070767 A1 | 3/2010 | Walker et al. | |
| 2010/0192212 A1* | 7/2010 | Raleigh | G06Q 10/06375 726/7 |
| 2010/0322141 A1* | 12/2010 | Liu et al. | 370/315 |
| 2011/0222408 A1* | 9/2011 | Kasslin et al. | 370/241 |
| 2011/0286321 A1* | 11/2011 | Sureshchandran | H04W 76/028 370/216 |

OTHER PUBLICATIONS

Chen, et al., "Cooperative Architecture for Cellular-short-range Combined Mesh Networks," Proceedings of the 5th International ICST Mobile Multimedia Communications Conference, No. 20, Sep. 2009, 6 pages.

PCT International Application No. PCT/KR2012/001460, Notification of Transmittal of the International Search Report and the Written Opinion of the International Searching Authority, or Declaration dated Sep. 28, 2012, 10 pages.

* cited by examiner (a)

(b)

METHOD OF TRANSMITTING AND RECEIVING DATA IN A WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2012/001460, filed on Feb. 27, 2012, which claims the benefit of U.S. Provisional Application Ser. No. 61/448,186, filed on Mar. 1, 2011, the contents of which are all hereby incorporated by reference herein in their entirety.

TECHNICAL FIELD

The present invention relates to a wireless communication, and more particularly, to a method of transmitting and receiving data between a base station and a user equipment in a connected-in-direct multi radio access technology (RAT) system without using an access point (AP) and apparatus therefor.

BACKGROUND ART

Recently, data traffic on a wireless communication network is increasing fast. This fast increasing data traffic is attributed to the advent and propagation of such a device requiring machine-to-machine (M2M) communication and high data traffic as a smart phone, a tablet PC and the like. In order to meet the required high data traffic, carrier aggregation (hereinafter abbreviated CA) by using more frequency bands efficiently, cognitive radio technology, MIMO technology for increasing data size within a limited range of frequency, multi-BS (multi base station) cooperative transmission technology and the like are getting the spotlight.

As ubiquitous environment has come, there is ongoing demand for receiving a seamless service irrespective of time and place using equipments.

Therefore, a wireless communication network establishes a cooperative system among a plurality of user equipments communicating with each other via a base station and has been making progress to enable at least one or more user equipments to transmit/receive data to/from a base station in accordance with the communication environment.

In this case, a plurality of the user equipments may include a source device as a subject to communicate with a base station with helps of other user equipments connected to the source device, a cooperative device playing a role as a relay to help a source device to communicate with a base station and a cooperative device candidate except a source device playing a role as a cooperative device.

A wireless communication system provided with user equipments in high density may be able to give higher system performance by the cooperation among the user equipments. For instance, in case of attempting to transmit prescribed data to a base station, a source device may transmit the data together with a cooperative device. Moreover, the source device may be able to transmit the data via the cooperative device. The above-described example may be identically applicable to a case that a base station transmits data to a user equipment, by which further excellent system performance may be accomplished. In the following description, a wireless communication system including a plurality of user equipments having established a cooperative system may be named a multi radio access technology (RAT) system.

However, since a source device has mobility, it may be necessary to periodically or aperiodically update information on a plurality of cooperative device candidates existing positions close to the source device. And, the demand for a corresponding solution is rising.

DISCLOSURE OF INVENTION

Technical Problem

An object of the present invention is to provide a method for a user equipment supporting a connected-in-direct multi-RAT (multi-radio access technology) without using an access point (AP) to perform a communication.

Another object of the present invention is to provide a method for a cooperative user equipment candidate supporting a connected-in-direct multi-RAT (multi-radio access technology) without using an access point (AP) to perform a communication.

Another object of the present invention is to provide a method for a base station supporting a connected-in-direct multi-RAT (multi-radio access technology) without using an access point to perform a communication.

Another object of the present invention is to provide a user equipment supporting connected-in-direct a multi-RAT (multi-radio access technology) without using an access point.

Another object of the present invention is to provide a cooperative user equipment candidate supporting a connected-in-direct multi-RAT (multi-radio access technology) without using an access point.

A further object of the present invention is to provide a base station supporting a connected-in-direct multi-RAT (multi-radio access technology) without using an access point.

Technical tasks obtainable from the present invention are non-limited the above mentioned effect. And, other unmentioned technical tasks s can be clearly understood from the following description by those having ordinary skill in the technical field to which the present invention pertains.

Solution to Problem

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of performing a communication, which is performed by a user equipment supporting a multi-RAT (multi-radio access technology), according to one embodiment of the present invention includes the steps of receiving a 1st information for identifying a 1st cooperative user equipment candidate from the 1st cooperative user equipment candidate corresponding to at least one of a plurality of cooperative user equipment candidates, transmitting the 1st information to a base station, receiving an information on at least one 2nd cooperative user equipment candidate determined among the at least one 1st cooperative user equipment candidate using the 1st information from the base station, and performing a communication of a 1st data with the base station in cooperation with the at least one 2nd cooperative user equipment candidate, wherein the user equipment and a plurality of the cooperative user equipment candidates support a direct communication without using an access point.

Preferably, the method further includes the step of transmitting a 1st probe request message to a plurality of the cooperative user equipment candidates, and the 1st information is received from the 1st cooperative user equipment candidate in a manner of being contained in a probe response message in response to the 1st probe request message.

Preferably, the 1st information includes at least one of a MAC (medium access control) address information and a service set identifier (SSID) information.

Preferably, a 1st radio access scheme is applied between the user equipment and a plurality of the cooperative user equipment candidates and a 2nd radio access scheme is applied between a plurality of the cooperative user equipment candidates and the base station.

More preferably, the 1st radio access scheme is WiFi (wireless fidelity) access scheme and the 2nd radio access scheme is WiMAX (worldwide interoperability for microwave access) scheme.

More preferably, the method further includes the step of performing a communication of a 2nd data with the base station by the user equipment via the 2nd radio access scheme.

Preferably, a same radio access scheme is applied among the user equipment, a plurality of the cooperative user equipment candidates and the base station.

Preferably, the method further includes the step of receiving an information on a 3rd cooperative user equipment candidate corresponding to at least one of a plurality of the cooperative user equipment candidates from the base station, and the 1st probe request message is transmitted to the 3rd cooperative user equipment candidate.

Preferably, the method further includes the steps of transmitting a 2nd probe request message to the 2nd cooperative user equipment candidate and receiving a 2nd probe response message from a 4th cooperative user equipment candidate corresponding to at least one of the at least one 2nd cooperative user equipment candidate in response to the 2nd probe request message. In this case, the communication of the 1st data with the base station is performed using at least one of the at least one 4th cooperative user equipment candidate.

More preferably, the 2nd probe request message is periodically transmitted.

To further achieve these and other advantages and in accordance with the purpose of the present invention, a method of performing a communication, which is performed by a cooperative user equipment candidate supporting a multi-RAT (multi-radio access technology), according to another embodiment of the present invention includes the steps of receiving a 1st information for identifying a user equipment from a base station, transmitting a probe request message to the user equipment using the 1st information, receiving a probe response message from the user equipment in response to the probe request message, transmitting a 2nd information indicating that the probe response message is received to the base station, and performing a communication of a 1st data with the base station using the user equipment, wherein the user equipment, the cooperative user equipment candidate and the base station support IBSS (independent basic service set) performing a direct communication without using an access point.

Preferably, a 1st radio access scheme is applied between the user equipment and the cooperative user equipment candidate and a 2nd radio access scheme is applied between the cooperative user equipment candidate and the base station.

More preferably, the 1st radio access scheme is WiFi (wireless fidelity) access scheme and the 2nd radio access scheme is WiMAX (worldwide interoperability for microwave access) scheme.

More preferably, a same radio access scheme is applied among the user equipment, the cooperative user equipment candidate and the base station.

To further achieve these and other advantages and in accordance with the purpose of the present invention, a user equipment, which supports a multi-RAT (multi-radio access technology), according to another embodiment of the present invention includes a receiving module receiving a 1st information for identifying a 1st cooperative user equipment candidate from the 1st cooperative user equipment candidate corresponding to at least one of a plurality of cooperative user equipment candidates, a transmitting module transmitting the 1st information to a base station, a processor, if an information on at least one 2nd cooperative user equipment candidate determined among the at least one 1st cooperative user equipment candidate using the 1st information is received from the base station via the receiving module, performing a communication of a 1st data with the base station in cooperation with the at least one 2nd cooperative user equipment candidate, wherein the user equipment and a plurality of the cooperative user equipment candidates support a direct communication not using an access point.

Preferably, the processor controls the transmitting module to transmit a 1st probe request message to a plurality of the cooperative user equipment candidates and the 1st information is received from the 1st cooperative user equipment candidate in a manner of being contained in a probe response message in response to the 1st probe request message.

Preferably, the 1st information includes at least one of a MAC (medium access control) address information and a service set identifier (SSID) information.

Preferably, a 1st radio access scheme is applied between the user equipment and a plurality of the cooperative user equipment candidates, a 2nd radio access scheme is applied between a plurality of the cooperative user equipment candidates and the base station, the 1st radio access scheme is WiFi (wireless fidelity) access scheme, and the 2nd radio access scheme is WiMAX (worldwide interoperability for microwave access) scheme.

More preferably, the processor controls the user equipment to perform a communication of a 2nd data with the base station via the 2nd radio access scheme.

To further achieve these and other advantages and in accordance with the purpose of the present invention, a cooperative user equipment candidate, which supports a multiRAT (multi-radio access technology), according to a further embodiment of the present invention includes a receiving module receiving a 1st information for identifying a user equipment from a base station, a transmitting module transmitting a probe request message to the user equipment using the 1st information, and a processor, if a probe response message is received from the user equipment via the receiving module in response to the probe request message, controlling the transmitting module to transmit a 2nd information indicating that the probe response message is received to the base station, the processor controlling a communication of a 1st data with the base station to be performed using the user equipment, wherein the user equipment, the cooperative user equipment candidate and the base station support IBSS (independent basic service set) performing a direct communication without using an access point.

It is to be understood that both the foregoing general description and the following detailed description are exemplary and explanatory and are intended to provide further explanation of the invention as claimed.

Advantageous Effects of Invention

Accordingly, the present invention provides the following effects and/or advantages.

First of all, a base station in a multi-RAT (multi-radio access technology) may be able to effectively transmit data to a source device according to the contents of the present invention.

Secondly, a source device in a multi-RAT (multi-radio access technology) may be able to effectively transmit data to a base station via a cooperative device according to the contents of the present invention.

Effects obtainable from the present invention are non-limited the above mentioned effect. And, other unmentioned effects can be clearly understood from the following description by those having ordinary skill in the technical field to which the present invention pertains.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, the following description of the present invention may be usable for various wireless access schemes including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution) and the like. OFDMA can be implemented with such a radio technology as IEEE (Institute of Electrical and Electronics Engineers) 802.11 (Wi-Fi), IEEE 802.16 (WiMAX), IEEE 802.20, E-UTRA (Evolved UTRA) and the like. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in DL and SC-FDMA in UL. And, LTE-A (LTE-Advanced) is an evolved version of LTE. Moreover, IEEE 802.16m is an evolved version of IEEE 802.16e.

In this specification, a terminology called 'radio access (multi-RAT)' may be variously named such a terminology as 'radio communication scheme' and the like.

Figure 1:
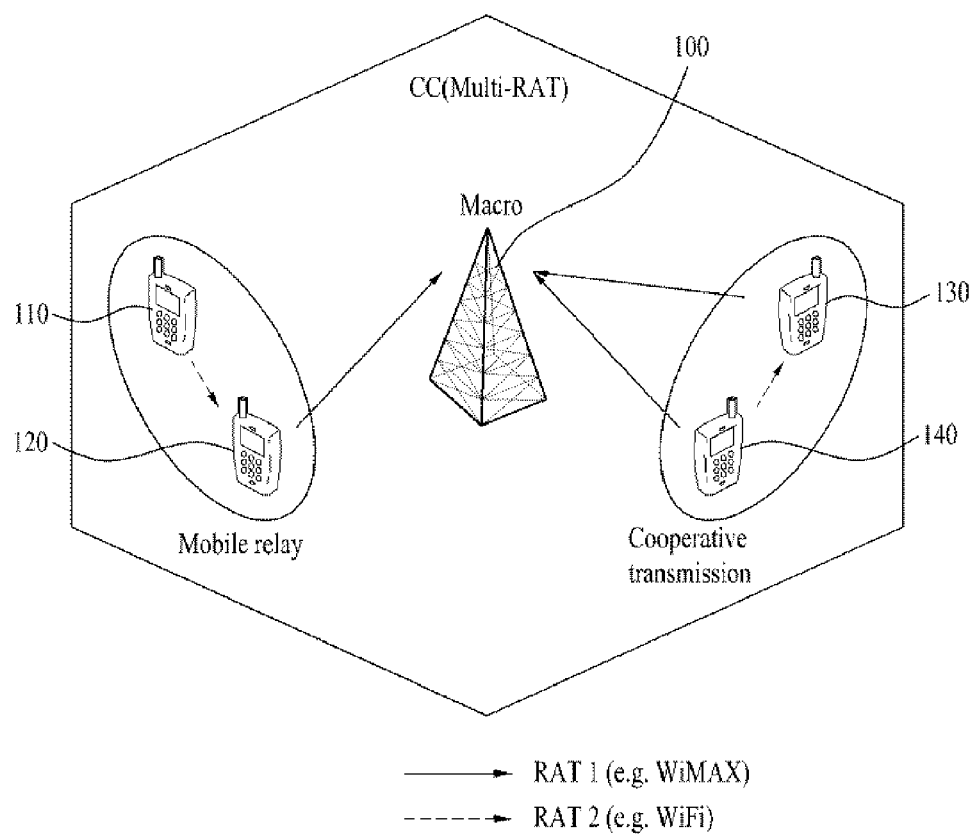
FIG. 1 is a diagram for one example of a multi-RAT (multi-radio access technology) system.

FIG. 1 is a diagram for one example of a multi-RAT (multi-radio access technology) system.

Referring to FIG. 1, a multi-radio access technology (hereinafter abbreviated a multiRAT) system may include a base station 100 and a plurality of communication devices 110, 120, 130 and 140.

The devices 1120, 120, 130 and 140 represented as communication devices in FIG. 1 may become a source device as a subject to communicate with a base station with helps of other user equipments connected to the source device, a cooperative device playing a role as a relay to help a source device to communicate with a base station and a cooperative device candidate except a source device playing a role as a cooperative device and the like.

In a multi-RAT system, a plurality of the communication devices 110, 120, 130 and 140 may establish a cooperative system with each other. In the cooperative system established multi-RAT system, a source device may be able to transmit data to a base station together with a cooperative device. Moreover, a source device may be able to receive data from a base station together with a cooperative device.

In this case, a direct radio communication scheme among a plurality of devices may differ from a direct radio communication scheme between a base station and a plurality of devices. In particular, data may be transceived by applying a wireless LAN access scheme (e.g., Wi-Fi, etc.) among a plurality of devices, while data may be transceived by applying a mobile communication network access scheme (e.g., IEEE 802.16 (WiMAX), etc.) between a base station and a plurality of devices.

For instance, a plurality of devices may perform a direct communication in-between by IEEE 802.11 (Wi-Fi) scheme or Bluetooth scheme. On the other hand, each of a plurality of devices may perform a direct communication with a base station by IEEE 802.16 (WiMAX) scheme.

Yet, the present invention may be non-limited by the above description and may enable a plurality of devices to communicate with each other by the same wireless or radio communication scheme.

In particular, a wireless LAN access scheme (e.g., Wi-FI, etc.) is applied between a plurality of devices to transceive data and may be applicable between a base station and a plurality of devices. A mobile communication network access scheme (e.g., IEEE 802.16 (WiMAX), etc.) is applied between a plurality of devices to transceive data and may be identically applied between a base station and a plurality of devices to transceive data.

Moreover, a scheme of communication between a base station and a plurality of devices may be called an in-band communication scheme, an in-band signaling communication scheme or the like in accordance with a wireless communication scheme.

Referring to FIG. 1, in the cooperative system established multi-RAT system, the source device 140 may be able to transmit data to the base station 100 together with the cooperative device 130. Through this, since a communication device may be able to efficiently transmit data, it may be able to secure good performance. Moreover, through the cooperative system established multi-RAT system, each device may be able to reinforce its throughput and power consumption may be reduced using a data communication via a cooperative system.

In the cooperative system established multi-RAT system, a source device may be able to transmit data to a base station via a cooperative device. And, a source device may be able to receive data from a base station via a cooperative device.

Referring to FIG. 1, in the cooperative system established multi-RAT system, the source device 100 may be able to transmit data to the base station 100 via the cooperative device 120. Through this, since a communication device may be able to efficiently transmit data, it may be able to prevent degradation of system performance.

Although FIG. 1 shows the example for a source device to transmit data to t abase station via a cooperative device, the above description may be identically applicable to a case for a base station to receive data from a source device as well.

When a different data is transmitted, referring to FIG. 1, the source device 110/140 may become a cooperative device or a neighbor device failing to join a data transmission and the cooperative device 120/130 may becomes a source device or a neighbor device failing to join a data transmission.

Figure 2:
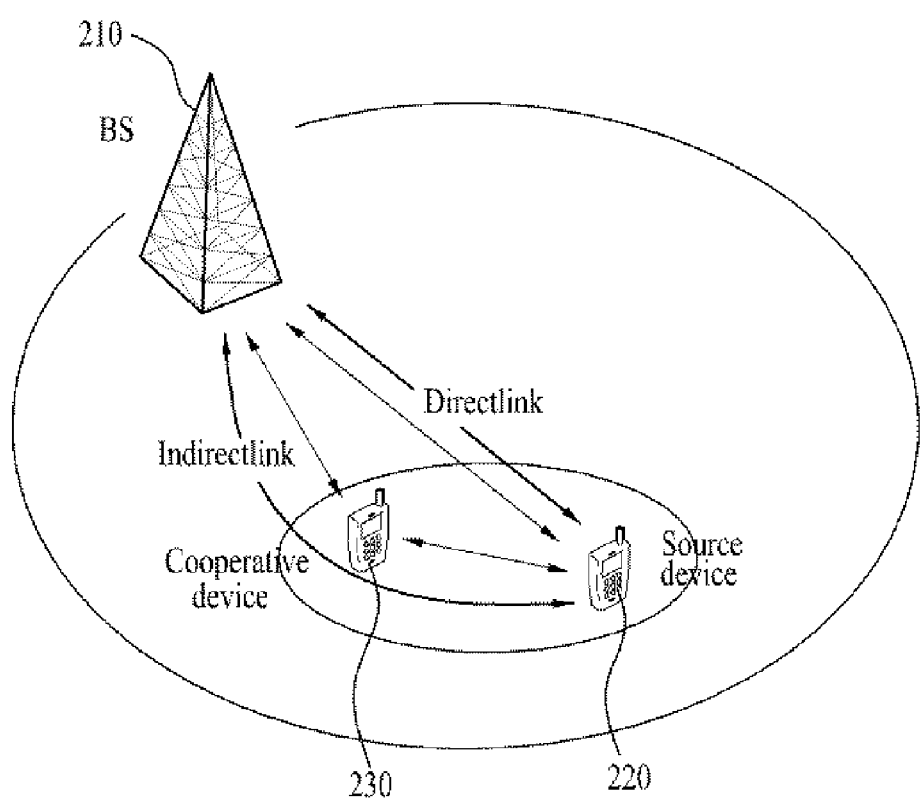
FIG. 2 is a diagram for one example of an operation of a multi-RAT (multi-radio access technology) system.

FIG. 2 is a diagram for one example of an operation of a multi-RAT (multi-radio access technology) system.

Referring to FIG. 2, a multi-RAT system may include a base station 210 and a plurality of communication devices 220 and 230.

In a multi-RAT system, a plurality of the communication devices 220 and 230 may be able to establish a cooperative system together by such a radio technology as 802.11 (Wi-Fi) and the like.

In general, each of a plurality of the communication devices 220 and 230 may be able to directly transmit/receive data to/from the base station 210 by such a radio technology as IEEE 802.16 (WiMAX) and the like.

In doing so, in case that a current communication quality of the source device 220 is abruptly lowered, it may be able to indirectly transmit data to the base station 210 via the cooperative device 230. Moreover, the source device 220 may be able to indirectly receive data from the base station 210 via the cooperative device 230.

Thus, in a multi-RAT system, a communication device may be able to directly exchange data with a base station and may be also able to indirectly exchange data with the base station with a help of a cooperative device having a good communication quality. Therefore, degradation of system performance can be prevented and efficient data communication can be performed.

In order to transmit and receive data with the cooperation of a plurality of communication devices in a multi-RAT system, a prior procedure for exchanging information in advance may be required.

The information exchanging procedure, which should be performed between a base station and a plurality of communication devices in a multi-RAT system may mainly include 4 steps. In particular, the 4 steps may include a general network entering step, a negotiating step for a plurality of devices to cooperate with each other, a step of searching neighbor devices of a source device and selecting a cooperative device from the searched neighbor devices, and a step of connecting to the selected cooperative device.

Meanwhile, in a multi-RAT system, a method for a plurality of communication devices to cooperatively communicate with each other may be classified into an infrastructure basic service set (infrastructure BSS) and an independent basic service set (independent BSS) in accordance with a presence or non-presence of using an access point (hereinafter abbreviated AP).

The access point (AP) may mean a connecting point between a base station and a plurality of user equipments in a multi-RAT system and may be called a mutual access point as well. For instance, the access point (AP) may be an intermediate agent that connects a wire LAN and a wireless LAN together.

Although the access point may be represented as ACCESS POINT, AP and the like, it may be just called an access point for clarity and convenience of the following description.

In case that an access point (AP) is used by a multi-RAT system, it may be able to provide a point-to-point function of enabling user equipments respectively situated at two different points to communicate with each other by connecting the user equipments together.

Unlike the point-to-point function, it may be able to provide a point-to-multipoint function of enabling a plurality of user equipments to communicate with each other by simultaneously connecting a plurality of the user equipments together.

And, it may be able to provide a repeater function of extending a data communication into a radio area by connecting to a base station and another access point (AP) by wireless. In particular, an access point (AP) set as a repeater may be able to communicate with another access point (AP) by providing a connection with a base station.

Moreover, it may be able to provide a wireless client function of exchanging signals by wireless in a manner of being connected to a plurality of user equipments capable of exchanging signals by a wired or short-range communication network.

Figure 3:
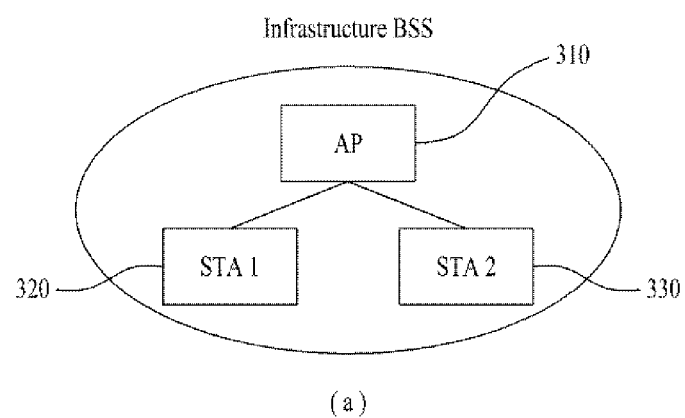
FIG. 3 is a diagram for a detailed example of a basic service set in accordance with a presence or non-presence of a use of an access point (AP)
Figure 3:
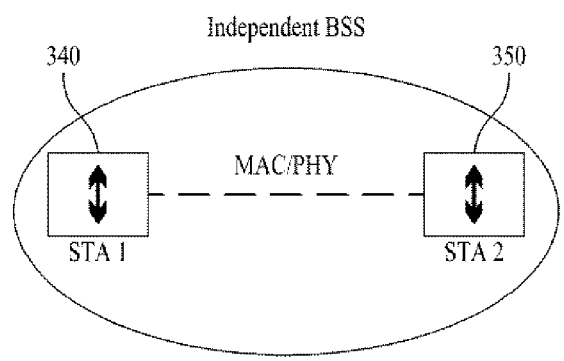

FIG. 3 is a diagram for a detailed example of a basic service set in accordance with a presence or non-presence of a use of an access point (AP).

FIG. 3 (a) shows one example of an infrastructure basic service set (BSS).

In the infrastructure basic service set (BSS), a plurality of user equipments performs communications using an access point (AP).

A multi-RAT system may include a plurality of access points (APs). And, a plurality of user equipments may exist around each of a plurality of the access points.

In the following description, an operation for a client cooperation in an infrastructure basic service set (BSS) configuration may be explained in detail with reference to FIG. 4.

Figure 4:
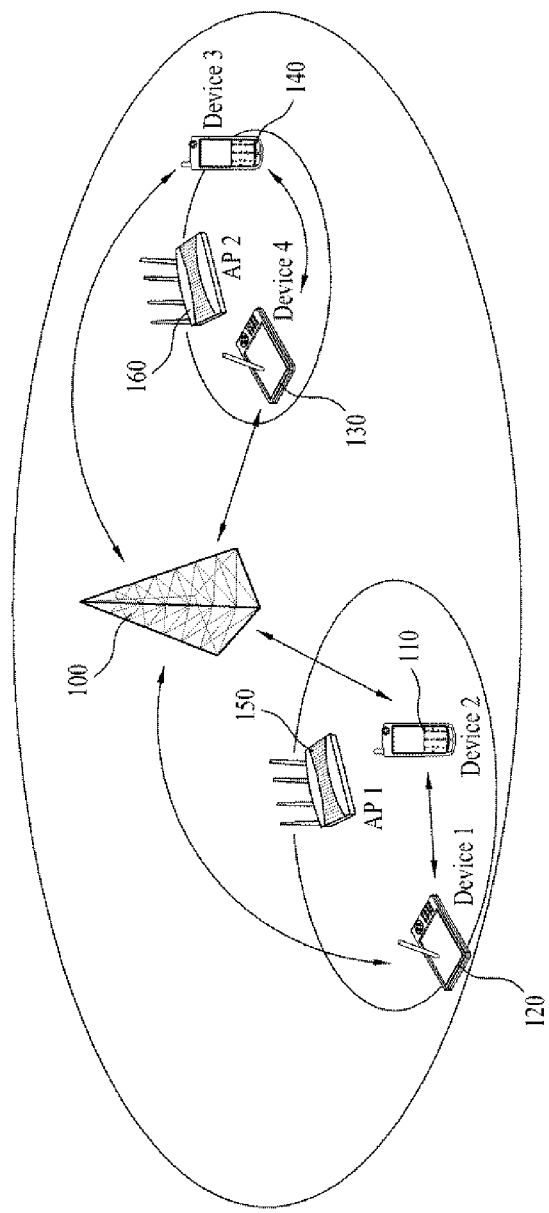
FIG. 4 is a diagram for one example of transceiving data between a base station and a user equipment in an AP-based (access point-based) multi-RAT system.

FIG. 4 is a diagram for one example of transceiving data between a base station and a user equipment in an AP-based (access point-based) multi-RAT system having the aforesaid access point (AP) applied thereto.

Referring to FIG. 4, a 1st access point 150 and a 2nd access point 160 may be included in a multi-RAT system.

A 1st user equipment 110 and a 2nd user equipment 120 exist in the vicinity of the 1st access point 150. And, each of the 1st user equipment 110 and the 2nd user equipment 120 may be able to perform a data communication operation for a client cooperation with a base station 100.

A 3rd user equipment 130 and a 4th user equipment 140 exist in the vicinity of the 2nd access point 160. And, each of the 3rd user equipment 130 and the 4th user equipment 140 may be able to perform a data communication operation for the client cooperation with the base station 100.

The above-mentioned contents includes a case that a plurality of user equipments are located within a coverage of each of a plurality of access points, a case that a plurality of user equipments are connected to each other by wireless, and a case that a plurality of user equipments are detected within a coverage. In particular, when a user equipment and an access point are correlated to each other, it may be able to implement the infrastructure basic service set (BSS).

Referring now to FIG. 3, FIG. 3 (b) shows one example of an independent basic service set (BSS).

In the independent basic service set, a plurality of user equipment may be directly connected to each other.

For clarity and convenience of the following description, assume that a plurality of user equipments configure an independent basic service set (BSS) in a manner of being connected in direct with each other. This assumption is just exemplary, by which the present invention may be non-limited.

In the following description, a structure of a radio frame applicable to the present invention is explained.

For clarity and convenience of the following description, a structure of a radio frame applicable in 3GPP LTE may be taken as an example, by which the present invention may be non-limited. And, various types of radio frame structures may be applicable to the present invention.

Figure 5:
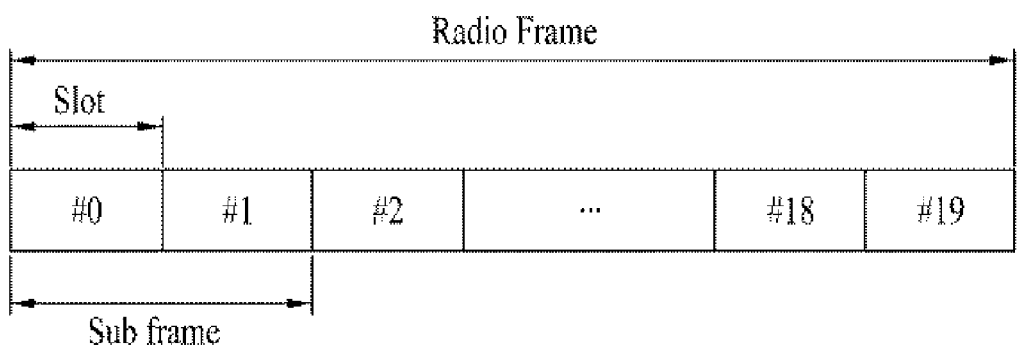
FIG. 5 is a diagram for a structure of FDD (frequency division duplex) radio frame in 3GPP LTE.

FIG. 5 is a diagram for a structure of FDD (frequency division duplex) radio frame in 3GPP LTE. This radio frame structure may be named a frame structure type 1.

Referring to FIG. 5, a radio frame may include 10 subframes and each of the subframes may be defined as 2 contiguous slots. A time taken for one subframe to be transmitted may be called a transmission time interval (TTI). A time length of a radio frame may be defined as 'Tf=307200*Ts=10 ms' and may include 20 slots. A time length of the slot may be defined as 'Tslot=15360*Ts=0.5 ms' and may be numbered as 0 to 19. A downlink, in which each node or base station transmits a signal to a user equipment, may be discriminated from an uplink, in which the user equipment transmits a signal to each node or base station, in frequency domain.

Figure 6:
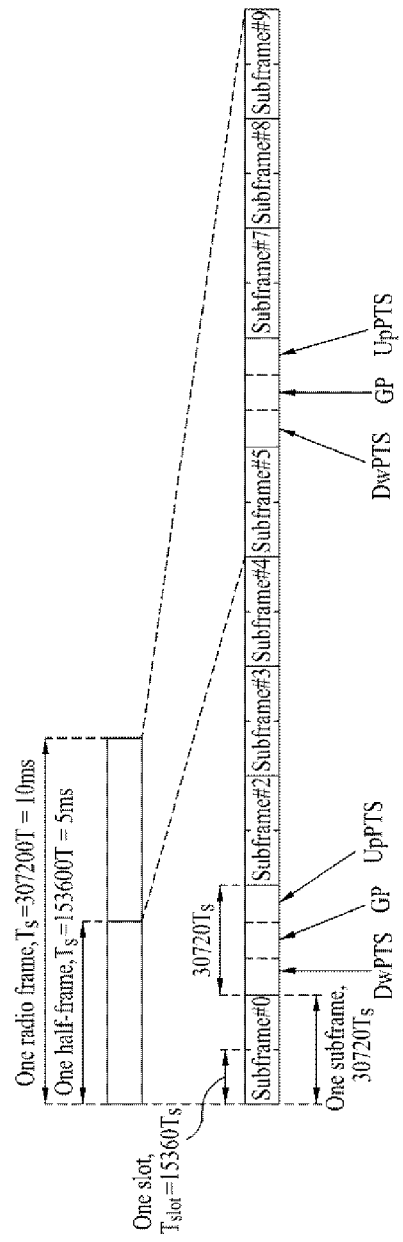
FIG. 6 is a diagram for a structure of TDD (time division duplex) radio frame in 3GPP LTE.

FIG. 6 is a diagram for a structure of TDD (time division duplex) radio frame in 3GPP LTE. This radio frame structure may be named a frame structure type 2.

Referring to FIG. 6, one radio frame may have a length of 10 ms and may include two half-frames each of which has a length of 5 ms. One subframe may be designated as one of a UL subframe, a DL subframe and a special subframe. One radio frame may include at least one UL subframe and at least one DL subframe. One subframe may be defined as 2 contiguous slots. For instance, a length of one subframe may be 1 ms and a length of one slot may be 0.5 ms.

A special subframe is a specific period for separating an uplink and a downlink from each other between a UL subframe and a DL subframe. At least one special subframe may exist in one radio frame. And, a special subframe may include a downlink pilot time slot (DwPTS), a guard period and an uplink pilot time slot (UpPTS). The DwPTS may be used for initial cell search, synchronization or channel estimation. The UpPTS may be used for channel estimation in a base station and a UL transmission synchronization matching of a user equipment. The guard period is an interval between an uplink and a downlink to eliminate an interference generated in UL due to a multi-path delay of a DL signal.

One slot in FDD/TDD radio frame may include a plurality of OFDM (orthogonal frequency division multiplexing) symbols in time domain and may include a plurality of resource blocks (RBs) in frequency domain. Since 3GPP LTE uses PFDMA in DL, the OFDM symbol may represent one symbol period and may be called such a different terminology as SC-FDMA symbol and the like in accordance with a multi-access scheme. The resource block may include a plurality of contiguous subcarriers in one slot by a resource allocation unit.

The radio frame structures described with reference to FIG. 5 and FIG. 6 may refer to Paragraph 4.1 and Paragraph 4.2 of 3GPP TS 36.211 V8.3.0 (2008-05) "Technical Specification Group Radio Access Network; Evolved Universal Terrestrial Radio Access (E-UTRA); Physical Channels and Modulation (Release 8)".

The above-mentioned radio frame structures may be just exemplary. And, the number of subframes included in a radio frame, the number of slots included in a subframe, the number of OFDM symbols included in a slot and the like may be modifiable in various ways.

Figure 7:
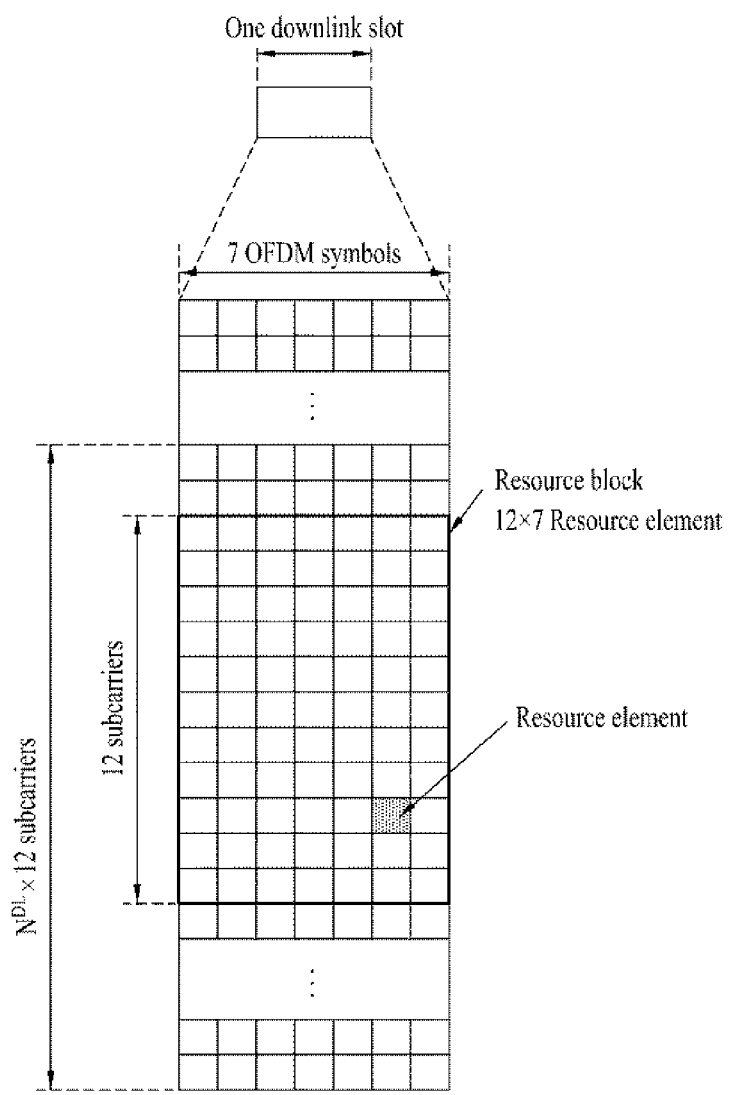
FIG. 7 is a diagram for one example of a resource grid for one downlink slot.

FIG. 7 is a diagram for one example of a resource grid for one downlink slot.

Referring to FIG. 7, one DL slot may include a plurality of OFDM symbols in time domain. In particular, one DL slot includes 7 OFDMA slots and one resource block (RB) includes 12 subcarriers in frequency domain, which is just exemplary and by which the present invention may be non-limited.

Each element on a resource grind may be called a resource element and one resource block (RB) includes 127 resource elements. The number NDL of resource blocks included in a DL slot may depend on a DL transmission bandwidth set for a cell. The above-mentioned resource grid for the DL slot may be applicable to a UL slot as well.

Figure 8:
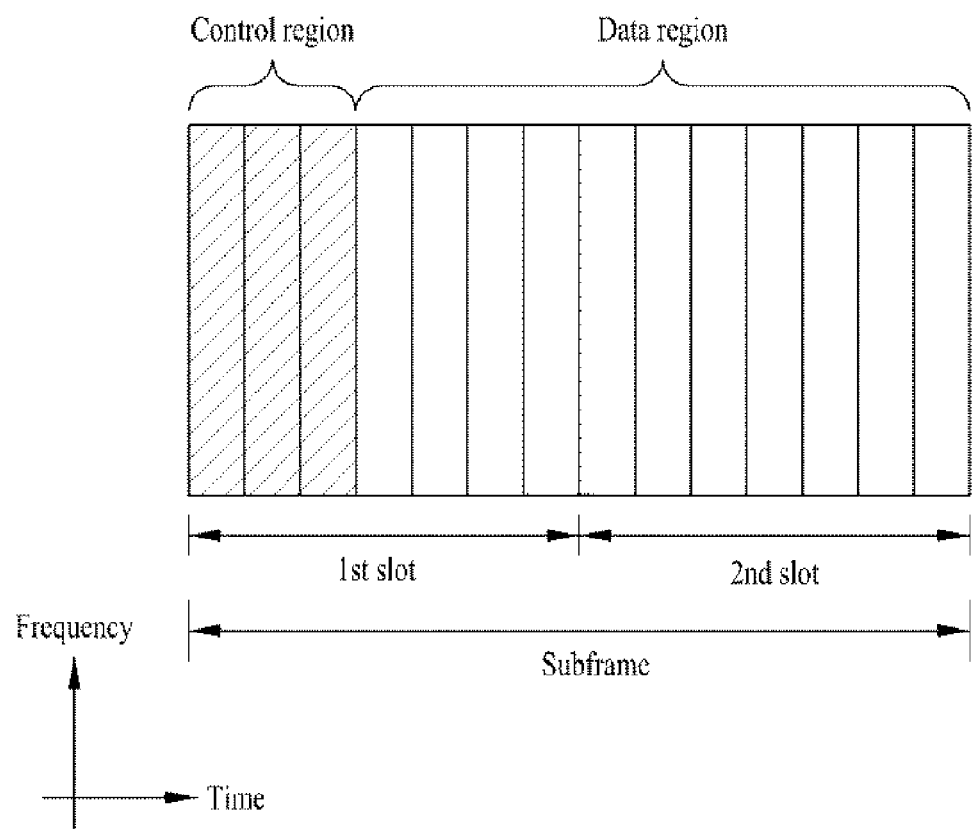
FIG. 8 is a diagram for one example of a structure of a downlink frame.

FIG. 8 is a diagram for one example of a structure of a downlink frame.

Referring to FIG. 8, a subframe may include 2 contiguous slots. Maximum 3 fore OFDM symbols of a 1st slot within the subframe may correspond to a control region to which DL control channels are allocated. And, the rest of OFDM symbols may become a data region to which PDSCH (physical downlink shared channel) is allocated.

In the DL control channel, PCFICH (Physical Control Format Indicator Channel), PDCCH (Physical Downlink Control Channel), PHICH (Physical Hybrid-ARQ Indicator Channel) and the like may be included. The PCFICH carried on a 1st OFDM symbol of a subframe may carry information on the number of OFDM symbols (i.e., a size of a control region) used for a transmission of control channels in the subframe. Control information carried on PDCCH may be called downlink control information (DCI). The DCI may indicate UL resource allocation information, DL resource allocation information, UL transmit power control command for random UE groups and the like. The PHICH may carry ACK/NACK (acknowledgement/negative-acknowledgement) signal for HARQ (hybrid automatic repeat request) of UL data. In particular, ACK/NACK signal for UL data transmitted by a user equipment may be carried on the PHICH.

The PDSCH is a channel that carries control information and/or data. A user equipment may be able to read data carried on the PDSCH by decoding DL control information carried on the PDCCH.

Figure 9:
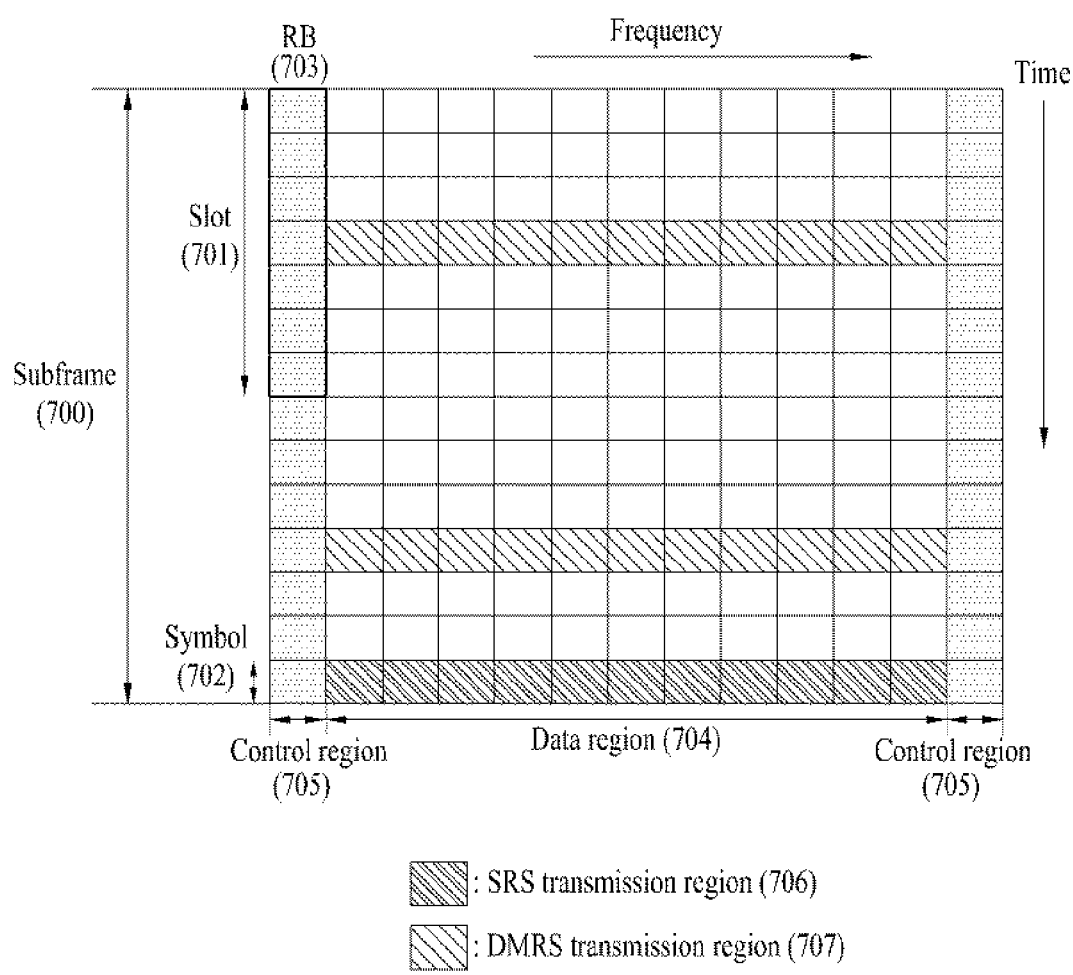
FIG. 9 is a diagram for a structure of an uplink subframe used in LTE system.

FIG. 9 is a diagram for a structure of an uplink subframe used in LTE system.

Referring to FIG. 9, a subframe 700 having a length of 1 ms, which is a basic unit of LTE UL transmission may include two 0.5 ms slots 701. Assuming a length of a normal cyclic prefix (CP), each slot includes 7 OFDM symbols 702 and one symbol corresponds to one SC-FDMA symbol. A resource block 703 is a resource allocation unit which corresponds to 12 subcarriers in frequency domain and one slot in time domain. A structure of UL subframe of LTE may be mainly divided into a data region 704 and a control region 705. In this case, the data region may mean a series of communication resources used in transmitting data of audio, packet and the like to each user equipment and may correspond to the rest of resources except the control region in the subframe. The control region may mean a series of communication resources used in transmitting a DL channel quality report from each user equipment, reception ACK/NACK for a DL signal and a UL scheduling request and the like.

According to the example shown in FIG. 9, a region 706 for transmitting a sounding reference signal in one subframe corresponds to an interval, in which an SC-FDMA symbol situated at a last position on a time axis in one subframe exists, and may be transmitted via a data transmission bandwidth on a frequency axis. Sounding reference signals of several user equipments, which are carried on last SC-FDMA in the same subframe, may be identifiable in a cyclic shift value. Moreover, a region for transmitting a DM-reference signal (demodulation-reference signal) in one subframe corresponds to an interval, in which a middle SC-FDMA symbol in one slot, i.e., 4th SC-FDMA symbol and 11th SC-FDMA symbol exist, and may be transmitted via a data transmission region on a frequency axis.

Figure 10:
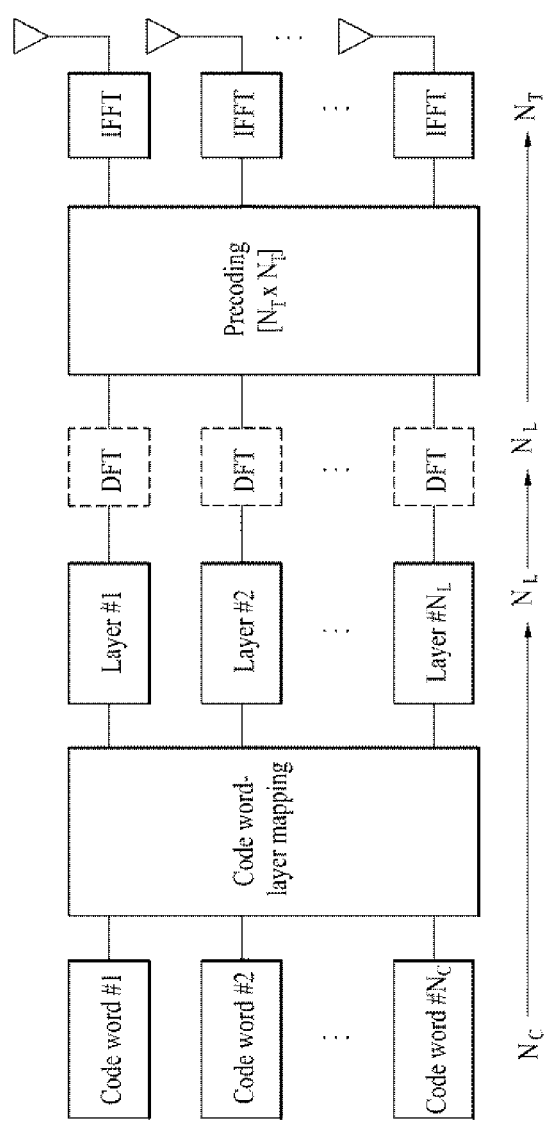
FIG. 10 is a diagram for explaining mapping relations among a code word, a layer and an antenna to transmit a downlink signal in a multi-antenna (MIMO) wireless communication system.

FIG. 10 is a diagram for explaining mapping relations among a code word, a layer and an antenna to transmit a downlink signal in a multi-antenna (MIMO) wireless communication system.

Referring to FIG. 10, a complicated mapping relation may exist between data information and transmission symbol. First of all, a MAC (medium access control) layer may deliver Nc transport blocks as data information to a physical layer. In the physical layer, the transport blocks may be transformed into a code word by channel coding and such a rate matching as puncturing, repetition and the like may be performed. In doing so, the channel coding may be performed by such a channel coder as a turbo encoder, a tail bit convolution encoder and the like.

After completion of the channel coding process and the rate matching process, the NC code words may be mapped to NL layers. In this case, each of the layers may indicate a different information sent using MIMO technology and the number of the layers may not be greater than a rank that is the maximum number for sending different informations. This may be represented as such a formula as ' ', where 'H' means a channel matrix.

For reference, unlike such a general DL transmission scheme as OFDMA (Orthogonal Frequency Division Multiple Access), DFT may be performed on each layer for a UL signal transmitted by SC-FDMA (Single Carrier-Frequency Division Multiple Access) in order to enable a transmitted signal to have a single carrier property by canceling out an effect of IFFT (Inverse Fast Fourier Transform) in part.

The signals transformed by DFT in the layers are multiplied by a precoding matrix, are mapped to NT transmitting antennas, respectively, and are then transmitted to a base station through IFFT.

Generally, a common reference signal and a UE-specific reference signal may exist in a DL reference signal and precoding may not be applied to the common reference signal. In particular, the UE-specific reference signal is precoded by being inserted into a precoding part and is then transmitted to a user equipment side, in the same manner of normal data.

In order to implement spatial multiplexing transmission non-dependent on channel using a UE-specific reference signal, i.e., a dedicated reference signal, there exist several conditions. First of all, in order to reduce signaling overhead of a reference signal, a transmission reference signal should be precoded using the same precoding matrix of a modulated data symbol. Moreover, in order to obtain spatial channel diversity, a precoding matrix should be switched between antennas. Yet, since the dedicated reference signal is transmitted across a whole transmission resource region according to a specific rule or randomly, it may not be easy to meet the above conditions. Since channel measurement is performed by a unit of a specific number of resource elements for the efficiency of the channel measurement, it may be unable to change a precoding matrix for precoding a dedicated reference signal by a resource element unit.

Meanwhile, in order for a plurality of communication devices to transmit/receive data cooperatively in a multi-RAT system, a pre-procedure for exchanging information beforehand may be required.

In each step of the information exchanging pre-procedure, each of the communication devices may enter one of three statuses including a 1st status of being disconnected from each other, a 2nd status of recognizing and authenticating a counterpart communication device, and a 3rd status of being associated with a counterpart communication device.

This may be described in detail with reference to Table 1 as follows.

TABLE 1

|  | Authentication | Association |
| --- | --- | --- |
| 1st Status | X | X |
| 2nd Status | ○ | X |
| 3rd Status | ○ | ○ |

First of all, the 1st status may mean a status that a plurality of communication devices in a multi-RAT system are not connected to each other at all. Hence, in the 1st status, each source device should perform data communication with a base station in direct.

Secondly, the 2nd status may mean a status that information on a counterpart communication device is obtained and that the counterpart communication device is authenticated.

For example of a method of obtaining information on a counterpart communication device, there is a passive method of receiving information on a counterpart communication device via a beacon message or an active method including the steps of sending a probe request message and receiving information on a counterpart communication device via a probe response message received in response to the sent probe request message.

Having obtained the information on the counterpart communication device, each of the communication devices may complete an authentication confirmation job by exchanging an authentication frame (e.g., authentication request and authentication response) with the counterpart communication device.

If the authentication confirmation job is completed, each of the communication devices may enter the 2nd status.

Finally, the 3rd status may mean a status of being associated with an authenticated counterpart communication device.

In particular, each of the communication devices may complete an association job (e.g., AID assignment, etc.) by exchanging an association frame (e.g., association request and association response) with the counterpart communication device. If the association job of a plurality of the communication devices in the radio access system is completed, the communication devices may be able to transmit and receive their data.

In the above description, the statuses of the communication devices in the respective steps of the information exchanging pre-procedure are explained. In the following description, in order to help the understanding of the present invention, the respective steps of the information exchanging pre-procedure in the radio access system including a base station may be explained in detail.

First of all, an information exchanging step, which should be performed between a base station and a plurality of communication devices in a multi-RAT system, may mainly include 4 steps. In particular, the 4 steps may include a general network entering step, a negotiating step for a plurality of devices to cooperate with each other, a step of searching neighbor devices of a source device and selecting a cooperative device from the found neighbor devices, and a step of connecting to the selected cooperative device.

For clarity and convenience of the following description, assume that a subject in each step of the information exchanging pre-procedure is a source device, by which the present invention may be non-limited. And, the substance of the present invention may be applicable to a device supporting a multi-RAT system, a cooperative device, a cooperative device candidate and the like for each step.

Figure 11:
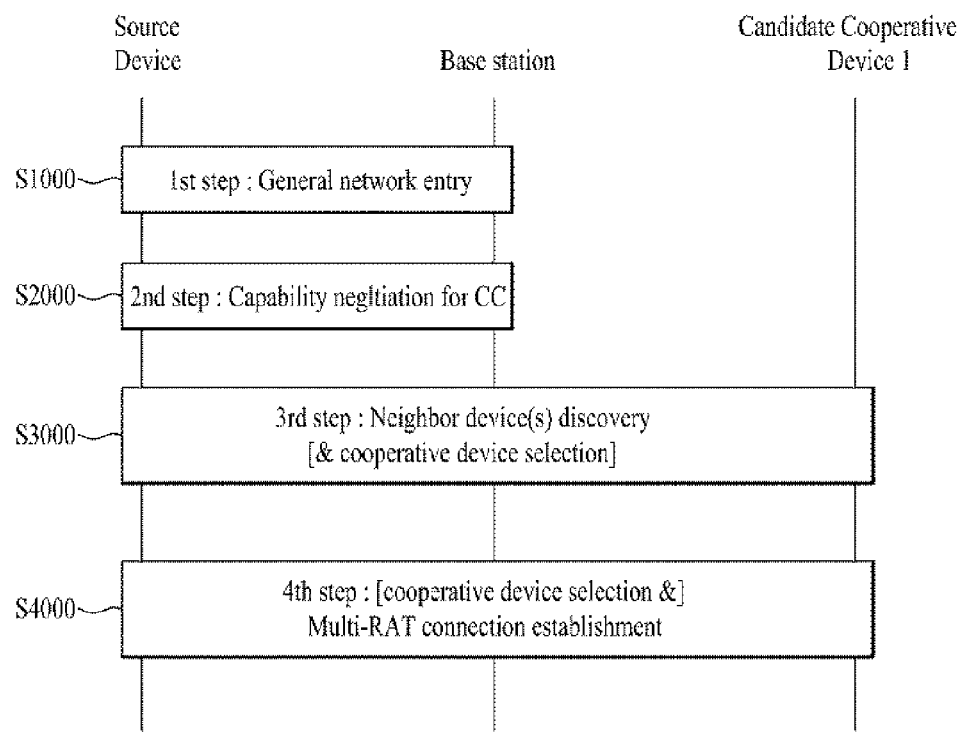
FIG. 11 is a diagram for one example of an information exchanging step requested to transmit/receive data between a base station and a plurality of devices in a multi-RAT (multi-radio access technology) system according to the present invention.

FIG. 11 is a diagram for one example of an information exchanging step requested to transmit/receive data between a base station and a plurality of devices in a multi-RAT (multi-radio access technology) system according to the present invention.

First of all, a source device may perform a general network entering step S1000 together with a base station. In particular, through the general network entering step S1000, the source device may be connected with the base station to transmit and receive data directly. For clarity and convenience of the following description, the general network entering step S1000 may be named a 1st step.

Subsequently, the source device having completed the 1st step together with the base station may perform a negotiating step S2000 to cooperate with a plurality of devices within the multi-RAT system. In the negotiating step S2000, the source device may negotiate with the base station for capability of a cooperative operation with the base station.

In doing so, information transceived between the base station and the source device may include connection RAT type information, system type information, system version information, location information, information on a presence or non-presence of possibility in playing a role as a cooperative device and the like.

For clarity and convenience of the following description, the negotiating step S2000 may be named a 2nd step.

Having performed the 2nd step, the base station, the source device and a plurality of the cooperative device candidates may perform a step S3000 of searching for neighbor devices and then selecting a cooperative device from the found neighbor devices. For clarity and convenience of the following description, assume that the step S3000 of selecting the cooperative device from the found neighbor devices may be named a 3rd step.

In the 3rd step, the base station, the source device and a plurality of the cooperative device candidates exchange their location informations with one another. Based on the exchanged location informations, a cooperative device to join a data communication within the multi-RAT system may be selected.

Having completed the 3rd step, the source device may perform a step S4000 of connecting with the selected cooperative device. If the step S4000 of connecting with the selected cooperative device is completed, the source device and the cooperative device, which are connected to each other, may cooperatively perform data transmission/reception to/from the base station.

For clarity and convenience of the following description, the step S4000 of connecting with the selected cooperative device may be named a 4th step.

In this case, each of the steps of the information exchanging pre-procedure may not be applied to all communication devices in common.

In particular, the 1st and 2nd steps should be performed in common by a plurality of the communication devices supporting the multi-RAT system. Yet, the 3rd and 4th steps may be performed by at least one of the source device, the cooperative device and the cooperative device candidate. And, it may be unnecessary for all communication devices to perform the 3rd step and the 4th step.

Occasionally, a portion of the 3rd step (e.g., obtaining the location informations of a plurality of the communication devices supporting the multi-RAT system) may be performed in common by all communication devices.

Thus, as all communication devices supporting the multi-RAT system should perform the 1st step and the 2nd step, the communication devices through the 1st and 2nd steps may not be identifiable from each other. The communication devices may be handled as preliminary source devices and preliminary cooperative devices through the 3rd step. After completion of the 4th step, the source device and the cooperative device are determined. Hence, the source device and the cooperative device may cooperative with each other to transceive data with the base station.

Meanwhile, in order to perform efficient data communication with a base station, a source device may search for a plurality of cooperative device candidates capable of performing client cooperation to perform an efficient data communication with a base station and may then perform a client cooperation operation by selecting at least one cooperative device from a plurality of the found cooperative device candidates.

In doing so, since the source device has mobility, it may be necessary to periodically or aperiodically update information on a plurality of the cooperative device candidates located close to the source device. Namely, if a location of the source device or the cooperative device is changed, a plurality of the cooperative device candidates capable of performing the client cooperation previously provided to the source device may be changed together.

In order to solve the above problem, the present invention may provide a procedure for obtaining a candidate group of cooperative devices for client cooperation with a source device and selecting a device capable of operating as a cooperative device from the obtained candidate group.

For clarity and convenience of the following description, assume that a method for a plurality of communication devices to cooperatively communicate with each other in a multi-RAT system is an independent basic service set (BSS) for the communication devices to communicate with each other by being connected with each other in direct. This is just one example of the present invention. And, it is apparent that the substance of the present invention is applicable to a case of an infrastructure basic service set (BSS).

In the following description, details of the present invention are explained with reference to FIG. 12.

Figure 12:
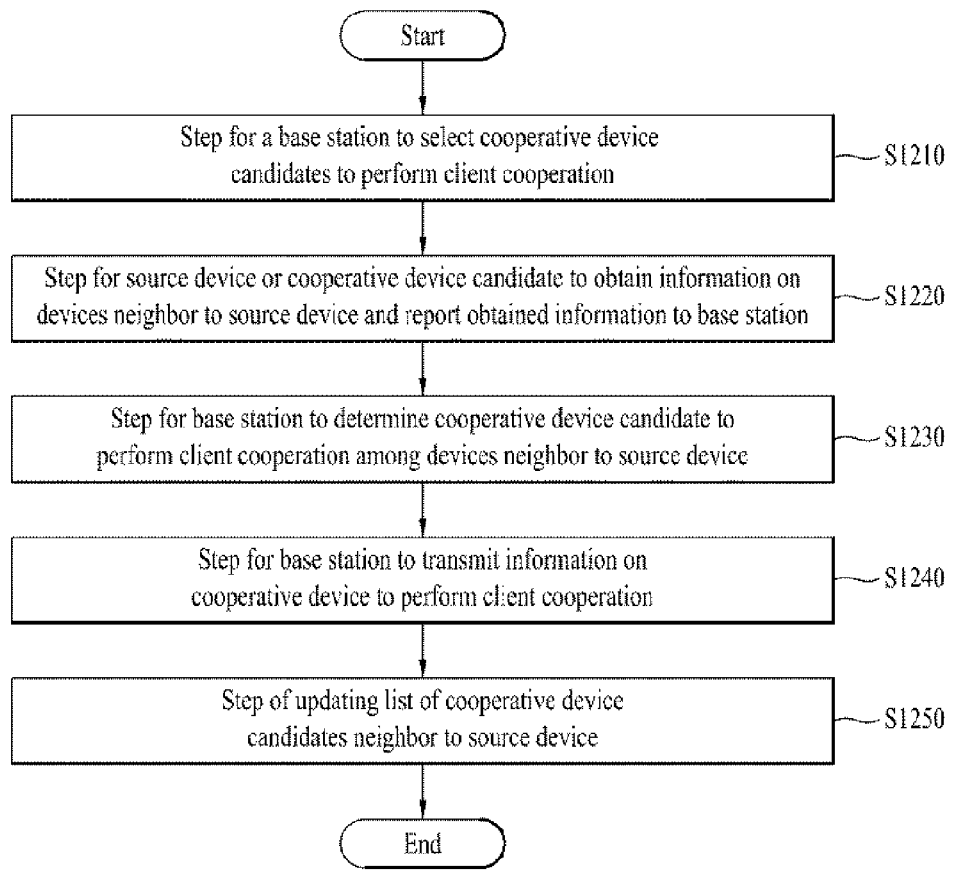
FIG. 12 is a flowchart for one example of obtaining cooperative device candidates in a connected-in-direct multi-RAT system and then determining a cooperative device for client cooperation among the cooperative device candidates according to the present invention.

FIG. 12 is a flowchart for one example of obtaining cooperative device candidates in a connected-in-direct multi-RAT system and then determining a cooperative device for client cooperation among the cooperative device candidates according to the present invention.

Referring to FIG. 12, a base station may perform a step S1210 of selecting cooperative device candidates in advance.

First of all, the base station may determine whether a specific device is capable of playing a role as a cooperative device for client cooperation in consideration of a moving speed (e.g., no mobility, low mobility, etc.), a location, a presence or non-presence of cooperative device candidate in the vicinity, the number of cooperative device candidates present in the vicinity, a retained power level, a channel status (e.g., channel status of high quality, etc.) and the like.

Yet, the above-mentioned factors for the base station to determine whether a specific device is capable of playing a role as a cooperative device are just exemplary for implementation of the present invention. And, it is apparent that the base station is able to determine whether a specific device is capable of playing a role as a cooperative device using other factors of different types.

Without using all of a plurality of the above-mentioned factors, the base station may be able to make a request for specific devices, each of which meets some of a plurality of the above-mentioned factors only, to transmit information on the rest of the factors.

For instance, the base station may be able to make a request for specific devices, each of which meets the preset factors 'moving speed' and 'location', to transmit information on a presence or non-presence of cooperative device candidate in the vicinity, information on the number of cooperative device candidates present in the vicinity, information on a retained power level, information on a channel status (e.g., channel status of high quality, etc.) and the like.

If a specific one of a plurality of devices meets the aforementioned factors, the base station may be able to make a request for the corresponding specific device to play a role as a cooperative device for client cooperation.

Having received the cooperative device role request, each of the specific devices may be able to grant or reject the request made by the base station.

In case that the corresponding device attempts to grant the request made by the base station, the corresponding device may transmit information required for the client cooperation (hereinafter abbreviated CC) to the base station.

The information required for the client cooperation (CC) may include a system type (e.g., IEEE 802.11a, IEEE 802.11b, IEEE 802.11g, 802.11n, etc.), a system version of Bluetooth, a MAC address used for its multi-RAT system, a service set identifier and the like.

Having granted the request made by the base station, if the corresponding device transmits the information required for the client cooperation (CC) to the base station, the corresponding device may be able to play a role as the cooperative device candidate for the client cooperation (CC).

Meanwhile, the corresponding device may negotiate whether it is able to play a role as a cooperative device in a network entry process or a network re-entry process.

In particular, in the aforementioned step S1000 or S2000 in FIG. 11, the corresponding device may notify whether it is able to play a role as a cooperative device to the base station.

In doing so, in accordance with a result of the negotiation, the base station may be able to determine whether to transmit the information for requesting to play the role as the cooperative device.

For instance, if the negotiation result is 'No' indicating that it is impossible to play the role as the cooperative device, the base station may not transmit the request for playing the role as the cooperative to the corresponding device.

For instance, only if the negotiation result is 'Yes' indicating that it is possible to play the role as the cooperative device, the base station may transmit the request for playing the role as the cooperative to the corresponding device.

For instance, in case that the negotiation result is 'Yes' indicating that it is possible to play the role as the cooperative device, if the corresponding device determines that it meets some of the aforementioned factors to determine whether a specific device can work as a cooperative device, the corresponding device turns on RF power of multiRAT (e.g., Wi-Fi) despite absence of a separate request made by the base station and may then perform a general procedure of the corresponding multi-RAT.

Meanwhile, the base station may be able to additionally determine a timing point of performing an operation for the client cooperation of the corresponding devices capable of playing roles as the cooperative device candidates in the step S1210.

In particular, the base station determines the corresponding device to perform the operation for the client cooperation on granting the cooperative device request or at an independent timing point irrespective of the request.

First of all, the corresponding device turns on its multi-RAT (e.g., Wi-Fi) RF power and performs a general operation of multi-RAT as soon as granting the request for playing the role as the cooperative device candidate.

Secondly, the base station sends a separate message via a specific trigger event at a timing point independent from a timing point of requesting to perform the role as the cooperative device candidate, thereby instructing cooperative device candidates to turn on multi-RAT RF powers and perform general operations of the corresponding multiRAT. For instance, a trigger event may include an event of activating multi-RAT client cooperative operation by relieving a specific message from a base station or a source device.

The base station may separately inform the corresponding device of activation time information of the multi-RAT operation. In this case, the activation time information of the multi-RAT operation may include duration information, finishing superframe # information and the like.

In case that the cooperative device candidate receives duration information from the base station, the cooperative device candidate may perform the multi-RAT operation during a time amounting to the duration from a reference time (e.g., a timing point of sending a request message for playing a role as a cooperative device candidate, a timing point of sending a multi-RAT performing request message, etc.).

In case that the cooperative device candidate receives the finishing superframe # information, the cooperative device candidate may perform the multi-RAT operation until the finishing superframe #.

Meanwhile, if the cooperative device candidate fails in receiving a communication request and/or response (e.g., RTS or probe response, etc.) from another device (e.g., a source device), the corresponding cooperative device candidate may end the multiRAT operation.

The base station may selectively instruct some of the cooperative device candidates to perform the multi-RAT operation (e.g., RF power-on operation, beacon transmitting operation, etc.).

For instance, the base station may be able to select a cooperative device candidate, which will be instructed to perform the multi-RAT operation, in consideration of a round trip delay or time advance value measured using a ranging procedure, RACH or the like.

In this case, the ranging procedure is the procedure for transmitting and receiving data between a base station and corresponding devices within an appropriate threshold range in a manner of obtaining accurate timing offset, frequency offset and power adjustments and then matching a transmission environment of a user equipment with that of a base station.

The reason why the measured round trip delay or time advance value or the like is taken into consideration is to select a cooperative device candidate group subset neighbor in an available range of communication with such a device as a preliminary source device located on a cell boundary and the like.

Although the step S1210 is described on the assumption of the independent basic service set (BSS), it may be applicable to a case of the infrastructure basic service set (BSS).

Referring now to FIG. 12, if the cooperative device candidates are selected, a step S1220 of obtaining information on devices neighboring to the source device is applied.

In the step S1220, the source device may be able to obtain information on the devices neighbor to the source device.

For instance, by a process for the source device to probe or search the independent basic service set (BSS) defined in 802.11 specifications for neighbor devices, the source device may be able to obtain the information on the devices located in the vicinity of the corresponding source device.

In particular, according to the process for the source device to search the independent basic service set (BSS) defined in 802.11 specifications for neighbor devices, it may be able to use a passive method of recognizing a corresponding device through a beacon frame transmitted by a neighbor device or an active method for a source device to recognize a neighbor device using a probe message.

In doing so, the step S1220 may be performed periodically or a specific timing point in accordance with a presence or non-presence of occurrence of a trigger event.

Meanwhile, the base station may inform the source device of information (e.g., MAC address, multi-RAT system, system version, etc.) on cooperative device candidate groups existing within its coverage.

In this case, the source device may be able to use the information, which is received from the base station, on the cooperative device candidate groups existing within the coverage of the base station in the course of searching for a neighbor device.

For instance, using the information on the cooperative device candidate groups, which is received from the base station, the source device may search corresponding candidate groups. If the source device does not receive any prescribed signal and/or response (e.g., beacon, probe response, etc.) from them, the source device may search neighbor devices by broadcasting or multicasting.

In particular, the above-mentioned method means that the candidate groups contained in the information, which is received from the base station, on the cooperative device candidate groups may have priority for the search.

This operation of the source device may be performed periodically or at a specific timing point in accordance with a presence or non-presence of occurrence of a trigger event.

Meanwhile, the base station may inform the cooperative device candidate groups of the information on the source device.

If so, the cooperative device candidate groups may be able to perform the step S1220 based on the received information on the source device. In particular, as the step S1220 is performed not by the source device but by the cooperative device candidate groups, the cooperative device candidate group finds a source device and a found cooperative device candidate may transmit information on the source device to the base station.

In case that the base station receives a response indicating that a source device is not found from all cooperative device candidate groups, the base station may instruct the source device to search or probe neighbor devices.

This information may be transmitted together with the request information in the step S1210 or may be delivered via a separate message in a prescribed step except the step S1210.

Once the information on the devices neighbor to the source device is obtained, a cooperative device to perform the client cooperation may be selected or determined [S1230].

The base station may be able to identify a corresponding device (in this case, assume that the corresponding device has accessed and entered the base station) using the information, which is obtained in the step S1220, on the neighbor devices neighbor to the source device.

For instance, in case that a base station and a plurality of devices communicate with each other by the same wireless communication scheme, MAC address used in 802.16 system is usable in common. Hence, the base station searches for a device having the same MAC address and may be then able to identify the corresponding device.

For another instance, in case that a wireless communication scheme between a plurality of devices is different from that between a base station and a plurality of the devices, it may be able to use a table for connecting each MAC address and the like.

In particular, if a corresponding multi-RAT device does not use a MAC address, which is used in 802.16 system, for 802.11 system, the corresponding multi-RAT device may inform a base station of a MAC address used in the 802.11 system.

This procedure may be performed in case of entering or re-entering a network of a corresponding base station, making a request for multi-RAT cooperation to a corresponding base station, receiving a request made by a base station, or the like.

In doing so, the base station may obtain MAC addresses, which are collected in the above procedure, of neighbor devices from a source device using 802.11 MAC addresses of multi-RAT devices accessing the base station and a table for connecting the MAC addresses and may be then able to identify the corresponding devices consequently.

Meanwhile, the base station may be able to determine which is the most appropriate device as a cooperative device candidate among a plurality of the neighbor devices obtained in the step S1220 in consideration of the conditions mentioned in the step S1210 and/or the number of source devices belonging to each of the cooperative device candidate groups and the like.

In a process for the base station to determine a cooperative device, if the corresponding device is a device that has not been negotiated as a cooperative device candidate with the base station, it may cause a problem.

If the corresponding device is not negotiated as the cooperative device candidate with the base station, the procedure described in the step S1210 may be applicable again.

In particular, the base station may determine whether the corresponding device is capable of playing a role as a cooperative device in consideration of a moving speed, a location, a presence or non-presence of cooperative device candidate in the vicinity, the number of cooperative device candidates present in the vicinity, a retained power level, a channel status and the like.

If some of the aforementioned determination factors meet the condition, the base station may be able to make a request for the corresponding device to transmit information on the rest of the factors.

If the corresponding device meets the condition of the determination factor, the base station may make a request for the corresponding device o play a role as a cooperative device candidate.

In response to the received request from the base station, as mentioned in the foregoing description, the corresponding device may grant or reject the received request.

If the corresponding device intends to grant the request from the base station, it may transmit information required for the client cooperation (CC) to the base station.

In this case, the information required for the client cooperation (CC) may include a system type (e.g., IEEE 802.11a, IEEE 802.11b, IEEE 802.11g, 802.11n, etc.), a system version of Bluetooth, a MAC address used for its multi-RAT system, a service set identifier and the like.

Having granted the request made by the base station, if the corresponding device transmits the information required for the client cooperation (CC) to the base station, the corresponding device may be able to play a role as the cooperative device candidate for the client cooperation (CC).

Although the step S1230 is described on the assumption of the independent basic service set (BSS), it may be applicable to a case of the infrastructure basic service set (BSS).

Once the cooperative device to perform the client cooperation is determined, information on the corresponding cooperative device to perform the client cooperation can be transmitted and received between the base station and a plurality of the devices [S1240].

The base station may be able to transmit the information (e.g., MAC address information, index number information in accordance with inclusion orders of neighbor devices transmitted by the source device, channel status information of each device, MAC address information of a newly recommended device, etc.) on the cooperative device candidates determined for the source device in the step S1230 to the source device.

In doing so, the source device may be able to update a list of the neighbor cooperative device candidates for the client cooperation in accordance with the information received from the base station [S1240]. And, the source device may be able to update the list of the neighbor cooperative device candidates periodically or in response to a specific event.

In particular, if beacons of cooperative device candidates, transmissions/receptions (or synchronizations) of response messages and the like are not performed persistently for predetermined duration, the corresponding source device may delete the corresponding cooperative device candidates from the list of the neighbor cooperative device candidates.

And, the source device may report the modified or maintained list of the neighbor cooperative device candidates to the base station periodically or in response to a request made by the base station.

If the above-described steps S1210 to S1250 are regularly performed, the source device and the base station may be able to maintain a latest list of neighbor cooperative device candidates.

Meanwhile, if the device corresponding to the cooperative device candidate fails in meeting the factor mentioned in the step S1210, the base station may release the corresponding device from the cooperative device candidate role. To this end, in particular, the role release may be notified to the corresponding cooperative devices or a connection with the source device is released.

And, the result of the cooperative device candidate role release may be reflected on the update of the list of the neighbor cooperative device candidates.

Meanwhile, in order to minimize the power consumption of the cooperative device candidates, the base station may instruct the cooperative device candidate to perform a multi-RAT operation (e.g., RF power-on, scan, etc.) only if a specific situation (e.g., an instantaneous situation for a base station or source device to determine a CC operation, a situation of a periodic cooperative device candidate list update, etc.) occurs.

Moreover, in order to prevent performance degradation of a wireless communication system, the corresponding cooperative device candidate makes determination of its own and may then request for a release from the cooperative device candidate role to the base station or the source device.

Figure 13:
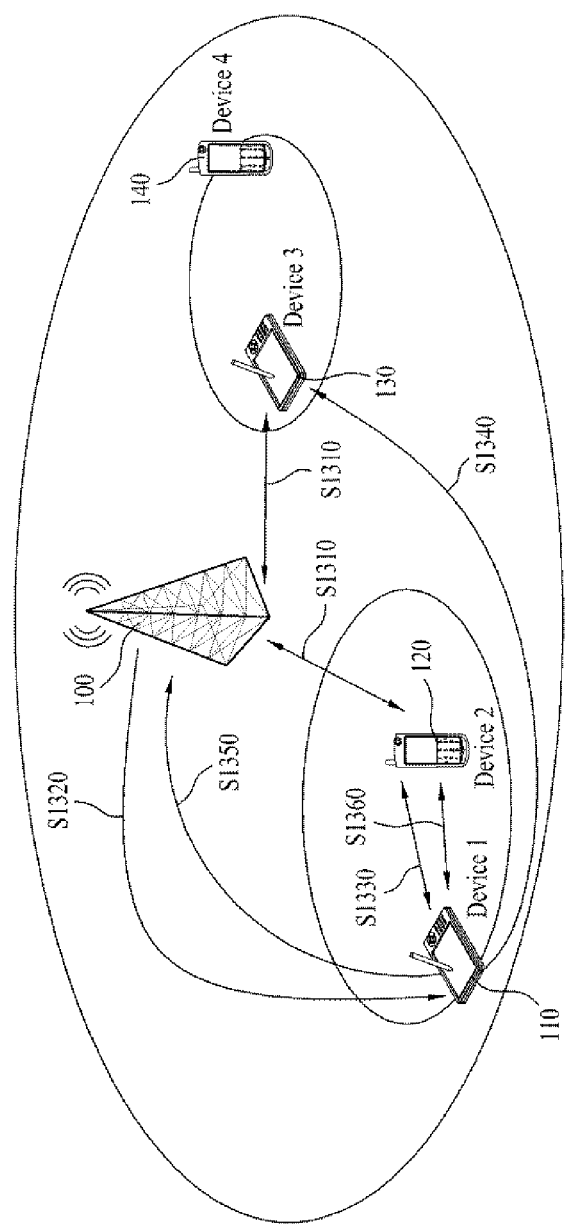
FIG. 13 is a diagram for one example that a source device becomes a subject for discovery to apply the present invention.

FIG. 13 is a diagram for one example that a source device becomes a subject for discovery to apply the present invention.

Referring to FIG. 13, a step S1310 shown in FIG. 13 may match the former step S1210 shown in FIG. 12.

In particular, a base station 100 may determine whether a specific device is capable of playing a role as a cooperative device for client cooperation in consideration of a moving speed (e.g., no mobility, low mobility, etc.), a location, a presence or non-presence of cooperative device candidate in the vicinity, the number of cooperative device candidates present in the vicinity, a retained power level, a channel status (e.g., a channel status of high quality, etc.) and the like.

In FIG. 13, assume that a 1st cooperative device candidate 120, a 2nd cooperative device candidate 130 and a 3rd cooperative device candidate 140 are determined as cooperative device candidates by the base station 100.

The base station 100 may be able to make a request for playing a role as a cooperative device for client cooperation to each of the 1st cooperative device candidate 120, the 2nd cooperative device candidate 130 and the 3rd cooperative device candidate 140.

In response to the requests made by the base station 100, assume that each of the 1st cooperative device candidate 120 and the 2nd cooperative device candidate grants the corresponding request and that the 3rd cooperative device candidate 140 does not grant the corresponding request.

Therefore, each of the 1st cooperative device candidate 120 and the 2nd cooperative device candidate 130 transmits information required for the client cooperation to the base station 100 to cope with the corresponding request grant.

In doing so, the information required for the client cooperation (CC) may include a system type (e.g., IEEE 802.11a, IEEE 802.11b, IEEE 802.11g, 802.11n, etc.), a system version of Bluetooth, a MAC address used for its multi-RAT system, a service set identifier and the like.

Steps S1320 to S1350 shown in FIG. 13 may correspond to the former step S1220 shown in FIG. 12.

First of all, in the step S1320, the base station 100 may transmit information on the cooperative device candidate groups 120 and 130 existing within its coverage to the source device 110.

In this case, the information on the information required for the client cooperation (CC) may include a system type (e.g., IEEE 802.11a, IEEE 802.11b, IEEE 802.11g, 802.11n, etc.), a system version of Bluetooth, a MAC address used for its multi-RAT system, a service set identifier and the like. Groups 120 and 130 may include MAC address, multi-RAT system, system version and the like.

Subsequently, the source device 100 sends a probe message to the 1st cooperative device candidate 120 and may then receive a probe response message from the 1st cooperative device candidate 120 in response to the sent probe message [S1330].

On the other hand, the source device 100 sends a probe message to the 2nd cooperative device candidate 130 and may not receive a probe response message from the 2nd cooperative device candidate 130 in response to the sent probe message [S1340].

Hence, the source device 110 reports the information on the 1st cooperative device candidate 120 as a neighbor device (e.g., a device present in the vicinity) to the base station 100 [S1350]. In this case, the information on the 1st cooperative device candidate 120 may include a MAC address.

The step S1360 shown in FIG. 13 may correspond to the former steps S1230 to S1250 shown in FIG. 12.

In particular, the base station 100 identifies the 1st cooperative device candidate 120 using the received MAC address of the 1st cooperative device candidate 120 and then determines whether the identified 1st cooperative device candidate 120 meets the requisites as a cooperative device for the client cooperation.

If the 1st cooperative device candidate 120 meets the requisites as the cooperative device for the client cooperation, the base station 100 notifies this fact to the source device 110.

The source device 110 updates a list using the received information on the neighbor cooperative device candidate from the base station 100 and may be then able to transceive data with the base station 100 using the cooperative device candidate 120 contained in the list.

As mentioned in the foregoing description, the source device 110 may be able to update the list of the neighbor cooperative device candidates periodically or in response to a specific event. In particular, if beacons of cooperative device candidates, transmissions/receptions (or synchronizations) of response messages and the like are not performed persistently for predetermined duration, the corresponding source device 110 may delete the corresponding cooperative device candidates from the list of the neighbor cooperative device candidates.

And, the source device 110 may report the modified or maintained list of the neighbor cooperative device candidates to the base station periodically or in response to a request made by the base station.

Figure 14:
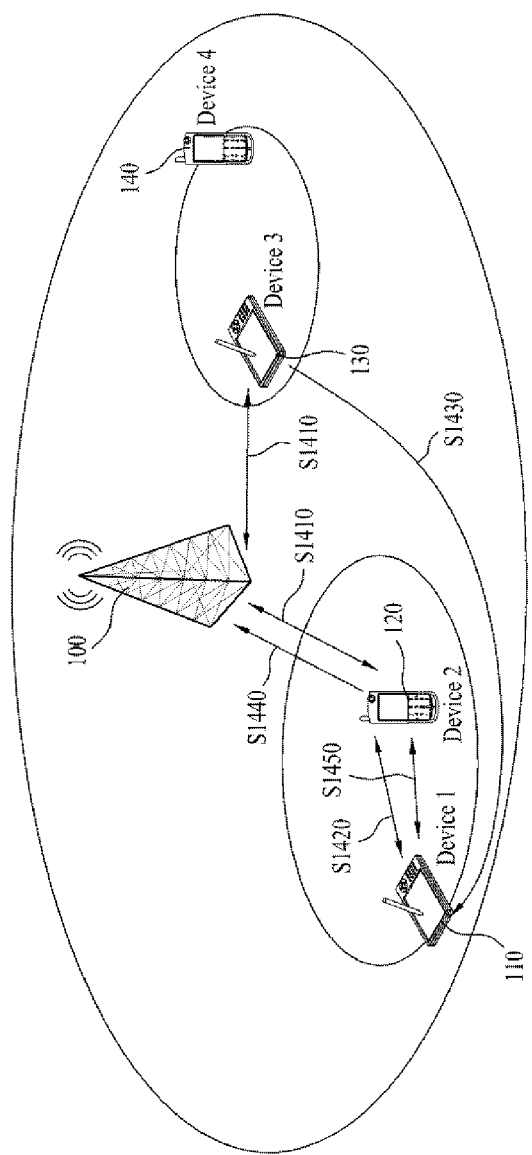
FIG. 14 is a diagram for one example that a cooperative device becomes a subject for discovery to apply the present invention.

FIG. 14 is a diagram for one example that a cooperative device becomes a subject for discovery to apply the present invention.

Referring to FIG. 14, a step S1410 shown in FIG. 14 matches the former step S1210 shown in FIG. 12.

In particular, a base station 100 may determine whether a specific device is capable of playing a role as a cooperative device for client cooperation in consideration of a moving speed (e.g., no mobility, low mobility, etc.), a location, a presence or non-presence of cooperative device candidate in the vicinity, the number of cooperative device candidates present in the vicinity, a retained power level, a channel status (e.g., a channel status of high quality, etc.) and the like.

In FIG. 14, assume that a 1st cooperative device candidate 120, a 2nd cooperative device candidate 130 and a 3rd cooperative device candidate 140 are determined as cooperative device candidates by the base station 100.

The base station 100 may be able to make a request for playing a role as a cooperative device for client cooperation to each of the 1st cooperative device candidate 120, the 2nd cooperative device candidate 130 and the 3rd cooperative device candidate 140.

In response to the requests made by the base station 100, assume that each of the 1st cooperative device candidate 120 and the 2nd cooperative device candidate grants the corresponding request and that the 3rd cooperative device candidate 140 does not grant the corresponding request.

Therefore, each of the 1st cooperative device candidate 120 and the 2nd cooperative device candidate 130 transmits information required for the client cooperation to the base station 100 to cope with the corresponding request grant.

In this case, the information required for the client cooperation (CC) may include a system type (e.g., IEEE 802.11a, IEEE 802.11b, IEEE 802.11g, 802.11n, etc.), a system version of Bluetooth, a MAC address used for its multi-RAT system, a service set identifier and the like.

In doing so, unlike FIG. 13, FIG. 14 shows that the information on the source device 110 may be transmitted to each of the 1st cooperative device candidate 120 and the 2nd cooperative device candidate 130. Hence, each of the 1st cooperative device candidate 120 and the 2nd cooperative device candidate 130 may be able to obtain the information on the source device 110 in advance.

Steps S1420 to S1440 shown in FIG. 14 may correspond to the former step S1220 shown in FIG. 12.

First of all, in the step S1420, the 1st cooperative device candidate 120 sends a probe message to the source device 110 and may then receive a probe response message from the source device 110 in response to the sent probe message.

On the other hand, in the step S1430, the 2nd cooperative device candidate 130 sends a probe message to the source device 110 and may not receive a probe response message from the source device 110 in response to the sent probe message.

Hence, the 1st cooperative device candidate 120 having successfully received the probe response message from the source device 110 may be able to transmit its MAC address, multi-RAT system, system version and the like to the base station 100.

In particular, referring to FIG. 14, the 1st cooperative device candidate 120 transmits its MAC address to the base station 100.

The step S1450 shown in FIG. 14 may correspond to the former steps S1230 to S1250 shown in FIG. 12.

In particular, the base station 100 identifies the 1st cooperative device candidate 120 using the received MAC address of the 1st cooperative device candidate 120 and then determines whether the identified 1st cooperative device candidate 120 meets the requisites as a cooperative device for the client cooperation.

If the 1st cooperative device candidate 120 meets the requisites as the cooperative device for the client cooperation, the base station 100 notifies this fact to the source device 110.

The source device 110 updates a list using the received information on the neighbor cooperative device candidate from the base station 100 and may be then able to transceive data with the base station 100 using the cooperative device candidate 120 contained in the list.

As mentioned in the foregoing description, the source device 110 may be able to update the list of the neighbor cooperative device candidates periodically or in response to a specific event. In particular, if beacons of cooperative device candidates, transmissions/receptions (or synchronizations) of response messages and the like are not performed persistently for predetermined duration, the corresponding source device 110 may delete the corresponding cooperative device candidates from the list of the neighbor cooperative device candidates.

And, the source device 110 may report the modified or maintained list of the neighbor cooperative device candidates to the base station periodically or in response to a request made by the base station.

Figure 15:
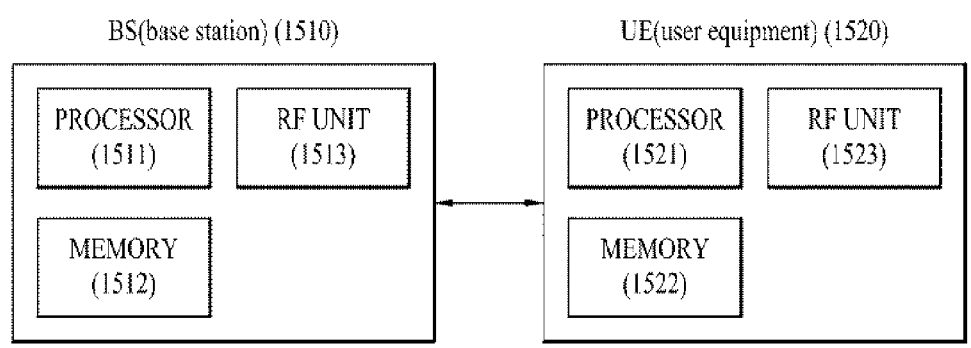
FIG. 15 is a block diagram for one example of a base station and a user equipment according to the present invention.

FIG. 15 is a block diagram of configurations of a base station apparatus 1510 and a communication apparatus 1520 supporting a multi-RAT system according to one preferred embodiment of the present invention. In the above description, such a terminology as a user equipment, a communication device and a communication apparatus has been interchangeably used. Yet, in order to prevent the confusion in using terminologies, such a terminology may be named a user equipment apparatus in the following description.

Referring to FIG. 15, a base station apparatus 1510 according to the present invention may include a receiving module 1511, a transmitting module 1512, a processor 1513, a memory 1514 and a plurality of antennas 1515. A plurality of the antennas 1515 may mean the base station apparatus supporting MIMO transmission and reception. The receiving module 1511 may be able to receive various signals, data and informations in UL from a user equipment. The transmitting module 1512 may be able to transmit various signals, data and informations in DL to the user equipment. And, the process 1513 may be able to control overall operations of the base station apparatus 1510.

The processor 1513 of the base station apparatus 1510 may also perform a function of operating information received by the base station apparatus 1510, information to be transmitted by the base station apparatus 1510 and the like. And, the memory 1514 may be able to store the operated information and the like for prescribed duration and may be substituted with such a component as a buffer (not shown in the drawing) and the like.

Referring to FIG. 15, a user equipment apparatus 1520 according to the present invention may include a receiving module 1521, a transmitting module 1522, a processor 1523, a memory 1524 and a plurality of antennas 1525. A plurality of the antennas 1525 may mean the user equipment apparatus supporting MIMO transmission and reception. The receiving module 1521 may be able to receive various signals, data and informations in DL from a base station. The transmitting module 1522 may be able to transmit various signals, data and informations in UL to the base station. And, the process 1523 may be able to control overall operations of the user equipment apparatus 1520.

The processor 1523 of the user equipment apparatus 1520 may also perform a function of operating information received by the user equipment apparatus 1520, information to be transmitted by the user equipment apparatus 1520 and the like. The memory 1524 may be able to store the operated information and the like for prescribed duration and may be substituted with such a component as a buffer (not shown in the drawing) and the like.

The above-described detailed configurations of the base station apparatus and the user equipment apparatus may be implemented in a manner that the above-mentioned descriptions of the embodiments of the present invention are independently applied or that at least two of the embodiments of the present invention are simultaneously applied. And, the redundant contents may be omitted for clarity.

In the description with reference to FIG. 15, the description of the base station apparatus 1510 may be identically applicable to a relay apparatus as a DL transmission subject or a UL reception subject. And, the description of the user equipment apparatus 1520 may be identically applicable to a relay apparatus as a DL reception subject or a UL transmission subject.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The present invention may be applicable to such a system as a multi-RAT system, a wireless communication system and the like. In particular the present invention may be applicable to a wireless mobile communication apparatus used for a cellular system.

The invention claimed is:

1. A method of performing a communication, which is performed by a user equipment supporting a multi-RAT (multi-radio access technology), comprising:
receiving an identifying information from at least one of a plurality cooperative user equipment candidates included in a cooperative user equipment candidate list,
wherein the cooperative user equipment candidate list is updated based on the location of the user equipment;
transmitting the identifying information to a base station;
receiving information of a cooperative user equipment from the base station,
wherein the cooperative user equipment is determined by the base station based on the identifying information; and
performing data communication related to the user equipment with the base station in cooperation with the determined cooperative user equipment without using an access point,
wherein a 1st radio access scheme is applied between the user equipment and the plurality of the cooperative user equipment candidates,
wherein a 2nd radio access scheme is applied between the plurality of the cooperative user equipment candidates and the base station and between the user equipment and the base station, and
wherein the user equipment exchanges a part of data related to the user equipment with the base station using the $2^{nd}$ radio access scheme directly and another part of data related to the user equipment with the base station via the determined cooperative user equipment using the $1^{st}$ radio access scheme and $2^{nd}$ radio access scheme.

2. The method of claim 1, further comprising:
transmitting a probe request message to the plurality of the cooperative user equipment candidates; and
in response to the probe request message, receiving from one of the plurality of the cooperative user equipment candidates a probe response message that includes the identifying information.

3. The method of claim 2, further comprising:
receiving, from the base station, an information on a cooperative user equipment candidate group corresponding to at least one of the plurality of the cooperative user equipment candidates,
wherein the probe request message is sent to the at least one of the plurality of cooperative user equipment candidates in a cooperative user equipment candidate group.

4. The method of claim 2, further comprising:
transmitting a probe request message to the determined cooperative user equipment; and
receiving a probe response message from the determined cooperative user equipment.

5. The method of claim 4, wherein the probe request message to the determined cooperative user equipment is periodically transmitted.

6. The method of claim 1, wherein the identifying information comprises at least one of a MAC (medium access control) address information and a service set identifier (SSID) information.

7. The method of claim 1, wherein the $1^{st}$ radio access scheme is WiFi (wireless fidelity) access scheme and wherein the $2^{nd}$ radio access scheme is WiMAX (worldwide interoperability for microwave access) scheme.

8. A method of performing a communication, which is performed by a cooperative user equipment candidate supporting a multi-RAT (multi-radio access technology), comprising:
receiving an identifying information of the user equipment from a base station,
wherein the received the identifying information is determined based on the location of the user equipment;
transmitting a probe request message to the user equipment using the identifying information;
receiving a probe response message from the user equipment in response to the probe request message transmitted to the user equipment;
transmitting, to the base station, an information indicating that the probe response message is received from the user equipment; and
performing data communication related to the user equipment with the base station using the user equipment without using an access point,
wherein a 1st radio access scheme is applied between the user equipment and the plurality of the cooperative user equipment candidates,
wherein a 2nd radio access scheme is applied between the plurality of the cooperative user equipment candidates and the base station and between the user equipment and the base station,
wherein the determined cooperative user equipment exchanges a part of data related to the user equipment with the base station using the $2^{nd}$ radio access scheme, and
wherein the determined cooperative user equipment exchanges the part of data related to the user equipment with the user equipment using the $1^{st}$ radio access scheme.

9. The method of claim 8, wherein the $1^{st}$ radio access scheme is WiFi (wireless fidelity) access scheme and wherein the $2^{nd}$ radio access scheme is WiMAX (worldwide interoperability for microwave access) scheme.

10. A cooperative user equipment candidate, which supports a multi-RAT (multi-radio access technology), comprising:
a receiver;
a transmitter; and
a processor operatively connected to the receiver and the transmitter, the processor configured to:
receive an identifying information of the user equipment from a base station, wherein the received identifying information is determined based on the user equipment;
transmit a probe request message to the user equipment using the identifying information;
receive a probe response message from the user equipment in response to the probe request message to the user equipment;
transmit, to the base station, information indicating that the probe response message is received from the user equipment; and
perform data communication related to the user equipment with the base station using the user equipment without using an access point,
wherein a 1st radio access scheme is applied between the user equipment and the plurality of the cooperative user equipment candidates,
wherein a 2nd radio access scheme is applied between the plurality of the cooperative user equipment candidates and the base station and between the user equipment and the base station,
wherein the determined cooperative user equipment exchanges a part of data related to the user equipment with the base station using the $2^{nd}$ radio access scheme, and
wherein the determined cooperative user equipment exchanges the part of data related to the user equipment with the user equipment using the $1^{st}$ radio access scheme.

11. A user equipment, which supports a multi-RAT (multi-radio access technology), comprising:
a receiver configured to receive information from an external device;
a transmitter configured to transmit information to an external device; and
a processor operatively connected to the receiver and the transmitter, the processor configured to:
receive an identifying information from at least one of a plurality of cooperative user equipment candidates included in a cooperative user equipment candidate list,
wherein the cooperative user equipment candidate list is updated based on the location of the user equipment;
transmit the identifying information to a base station;
receive information of a cooperative user equipment from the base station,
wherein the cooperative user equipment is determined among the plurality of cooperative user equipment candidates by the base station based on the identifying information; and
perform data communication related to the user equipment with the base station in cooperation with the cooperative user equipment without using an access point,
wherein a 1st radio access scheme is applied between the user equipment and the plurality of the cooperative user equipment candidates,
wherein a 2nd radio access scheme is applied between the plurality of the cooperative user equipment candidates and the base station and between the user equipment and the base station, and
wherein the user equipment exchanges a part of data related to the user equipment with the base station using the $2^{nd}$ radio access scheme directly and another part of data related to the user equipment with the base station via the determined cooperative user equipment using the $1^{st}$ radio access scheme and $2^{nd}$ radio access scheme.

12. The user equipment of claim 11, wherein the processor is further configured to:
transmit a probe request message to the plurality of the cooperative user equipment candidates; and
receive, from one of the plurality of the cooperative user equipment candidates, a probe response message that includes the identifying information.

13. The user equipment of claim 11, wherein the identifying information comprises at least one of a MAC (medium access control) address information and a service set identifier (SSID) information.

14. The user equipment of claim 11,
wherein the $1^{st}$ radio access scheme is WiFi (wireless fidelity) access scheme, and wherein the $2^{nd}$ radio access scheme is WiMAX (worldwide interoperability for microwave access) scheme.

* * * * *